Jan. 10, 1950

J. L. LAY 2,494,047

AFFIXING LINERS TO CAPS

Filed March 9, 1948

INVENTOR
John L. Lay
BY
ATTORNEYS

Patented Jan. 10, 1950

2,494,047

UNITED STATES PATENT OFFICE 2,494,047

AFFIXING LINERS TO CAPS

John L. Lay, Ogden, Pa., assignor to A. H. Wirz, Inc., Chester, Pa., a corporation of Pennsylvania Application March 9, 1948, Serial No. 13,923

6 Claims. (Cl. 154—89)

1

The present invention relates to a process and apparatus for affixing liners to caps especially for collapsible tubes.

A purpose of the invention is to assure firm and easy attachment of liners to caps especially for collapsible tubes.

A further purpose is to avoid the necessity of dispensing adhesive to the cap or to the liner at the point of insertion of the liner.

A further purpose is to eliminate the necessity for the application of heat to attach collapsible tube cap liners.

A further purpose is to make possible the handling of the liner material in the presence of heat without undesirable adhesion between the liner sheets or between a liner sheet and associated mechanism.

Further purposes appear in the specification and in the claims.

In the drawings I have chosen to illustrate one only of the many embodiments in which my invention may appear, choosing the form shown from the standpoints of convenience in illustration, satisfactory operation and clear demonstration of the principles involved.

In the collapsible tube industry, the closure caps for collapsible tubes have commonly been made of plastic, metal or the like, and in some instances have been provided with sealing liners or inserts frequently of cork, cork laminated with tin foil, cork laminated with wax paper or plastic sheet, tin foil laminated with paper, or the like. When reference is made to tin foil, it is intended to include the various similar foils such as lead foil, aluminum foil and the like.

Liners of this character have in some cases been inserted purely mechanically, reliance being had upon the gripping at the edges of the bottom of the cap recess. In some cases also use has been made of a thermoplastic liner adhesive, which is softened under heat after the liner has been applied to affix the liner to the bottom of the cap (Rogers U. S. Patent 2,322,885). While the thermoplastic liner application is satisfactory in many cases, it necessitates an extra step of heat application unless the tubes are to be subjected to heat in the normal procedure of filling. This thermoplastic process also necessitates the use of a readily thermoplastic adhesive which

2 may cause difficulty in case the liner sheet material is brought to a relatively high temperature during shipment or comes in contact with a portion of a machine which has become heated from friction or otherwise, and adheres thereto.

In the crown cap industry much less difficulty is encountered because the diameter of the crown is much larger and the liner or spot is larger and easier to manipulate. In the crown cap industry efforts have been made to apply adhesive with varying success, as the adhesive is viscous and usually difficult to administer uniformly. As the adhesive is not volatile, any excess in adhesive application may result in abnormal positioning of the liner, which may cause leakage when the cap is applied.

I have discovered that it is possible to apply liners in collapsible tube caps and other caps without the necessity of administering adhesive at the point where the liner is inserted in the cap and without the need for heat.

In accordance with my invention, the liner or liner material is precoated with an adhesive, which is allowed to dry, and the adhesive is softened by a solvent at the time of application of the liner to the cap.

Figure 1:
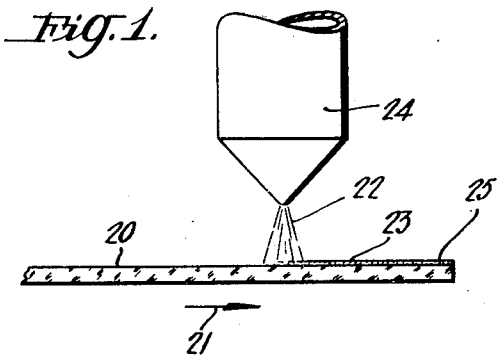
Figures 1, 2 and 3 are diagrammatic vertical sections useful in explaining the invention.

In Figure 1 a sheet of liner such as cork or the like is shown at 20 progressing in the direction of the arrow 21 and receiving on its upper surface a spray 22 of adhesive to form a coating layer 23. The spray is administered by a suitable series of sprayheads 24 (only one of which is shown). The adhesive is allowed to dry as shown at 25.

Any suitable adhesive which can later be softened by a volatile solvent may be used, the preferred type being a rubber latex base adhesive such as Pliabond. A chlorinated rubber adhesive may also be used, or a vinyl chloride-vinyl acetate copolymer adhesive may be employed. These materials need not be compounded for thermoplastic adhesion.

It will be evident, of course, that the adhesive may be applied at a point entirely remote from the application of the liners to the caps, and conveniently by a coating machine.

Figure 2:
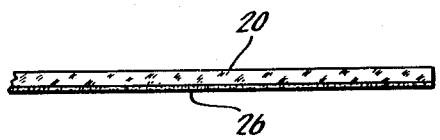

As illustrated in Figure 2, the adhesive face 26 is downwardly directed in the preferred embodiment so that the liner can be disposed with the adhesive face toward the mouth of caps having upwardly directed recesses.

Figure 3:
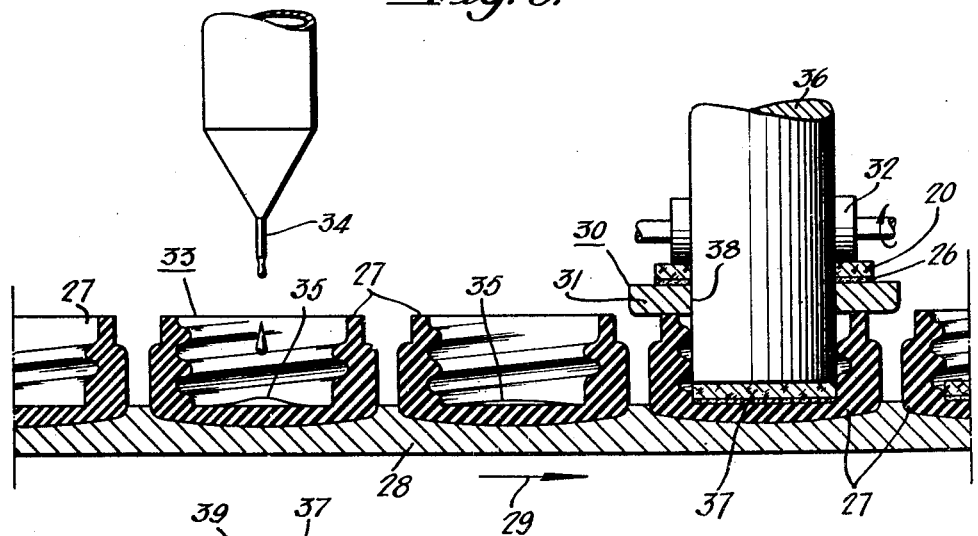
Figure 4:
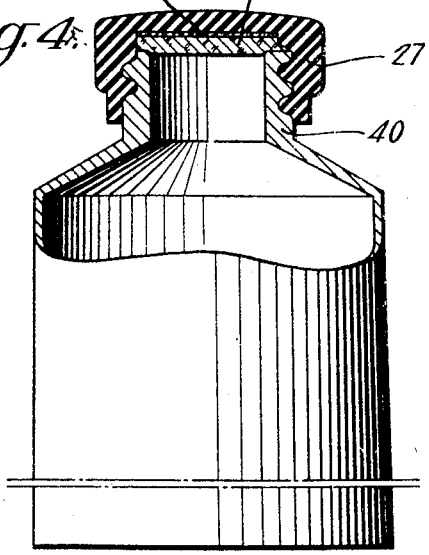
Figure 4 is a fragmentary elevation partly in longitudinal section of a cap applied to a collapsible tube and having a liner inserted in accordance with the invention.

As illustrated in Figure 3, the caps 27, suitably for collapsible tubes, are positioned on a conveyor 28 of any suitable type moving in the direction of the arrow 29. The caps on the conveyor pass to a station 30 at which the liner is to be applied.

At the station 30 the cork or other liner sheet 20 with the dry adhesive face 26 directed downwardly is progressed over a die plate 31 above the caps, the progression being accomplished by a feed 32 advancing the liner sheet toward the observer and preferably transversely to the movement of the conveyer 28.

A volatile solvent suited to the particular adhesive is introduced into the upwardly disposed recesses of the caps, preferably at a station 33 in advance of the station 30. A suitable applicator 34, such as a well known dropping dispenser is used at the station 33.

The particular solvent will vary with the composition of the adhesive. For example, for a rubber latex base adhesive methyl ethyl ketone may be used, and methyl isobutyl ketone is a suitable alternate. These same solvents may be employed for the vinyl chloride-vinyl acetate copolymer above referred to. Other well known volatile solvents may be used.

A very small amount of solvent, indicated as a drop or two at 35 will serve. When the cap is in the position 30, suitably during a dwell in intermittent forward movement of the cap conveyer, a punch 36 comes down, punching out a liner disc 37 suitably through a die opening 38 of the die plate.

The action of the punch forces the liner 37 downward into the cap with the adhesive face forward, causing the adhesive face to contact and be softened by the solvent, and suitably carries through and presses the liner into adhesive relation with the bottom of the cap recess, applying sufficient pressure at the end of the stroke to cause firm seating. Any excess of solvent, being highly fluid, is forced out of the space behind the liner and either squirted out of the cap or displaced to the position above the liner where it can quickly evaporate. In a very few seconds with a volatile solvent all solvent will be removed and the adhesive will be firmly affixed. Of course it is not necessary to apply the plunger pressure until all solvent is removed.

The final closure cap has the adhesive very firmly affixed at 39 so that it will not be displaced as the cap is removed from the collapsible tube 40.

It will be evident that the process can be applied with a wide variety of adhesives and various types of liners.

An interesting feature is that the effect of the solvent on resensitizing of the adhesive is to make the adhesive tacky so that the firmness of bond between the liner and cap can be improved by subsequent application of presure even after an extended period of time. For example, I find that after the adhesive has been resensitized by contact with the solvent, if a liner is pried out of the cap for experimental purposes it carries a tacky adhesive coating. This liner when reapplied in the cap even several weeks or a month later has a pressure sensitive adhesive property, and firmly bonds to the cap when screwed on the tube. Thus, it is seen that the caps themselves as they leave the machine in which the liners are applied need not have the full firmness of bond of adhesive to the liners, since the pressure sensitivity of the adhesive permits firmer adhesion when the caps are tightened on the tubes.

It will be evident of course that while I prefer to apply the adhesive, the solvent and the liner automatically, these operations can if desired be performed by hand or by other suitable mechanism.

In view of my invention and disclosure variations and modifications to meet individual whim or particular need will doubtless become evident to others skilled in the art, to obtain all or part of the benefits of my invention without copying the process and apparatus shown, and, I, therefore, claim all such insofar as they fall within the reasonable spirit and scope of my claims.

Having thus described my invention what I claim as new and desire to secure by Letters Patent is:

1. The process of affixing a liner to the inside of a hollow circular collapsible tube cap, which comprises applying an adhesive to one face of the liner, allowing the adhesive to dry, introducing into the cap a volatile solvent free from adhesive, introducing the liner into the cap directly against the bottom of the cap with the adhesive face of the liner toward the cap and softening the adhesive by the volatile solvent, and allowing the solvent to evaporate.

2. The process of affixing a liner to the inside of a hollow circular collapsible tube cap, which comprises applying an adhesive to one face of a sheet liner material, allowing the adhesive to dry, introducing into the cap a volatile solvent free from adhesive, bringing the sheet with the adhesive face toward the cap into a position in line with and adjacent the mouth of a cap, cutting out a liner disc from the sheet and moving the disc forward into the cap, seating the disc directly against the bottom of the cap recess and softening the adhesive by the solvent, and allowing the solvent to evaporate.

3. The process of affixing a liner to the inside of a hollow circular collapsible tube cap, which comprises, applying an adhesive to one face of the liner, allowing the adhesive to dry, positioning the cap mouth upward, applying a volatile solvent for the adhesive free from adhesive into the cap, introducing the liner into the extreme bottom of the cap with the adhesive face downward, softening the adhesive with the solvent, and allowing the solvent to evaporate.

4. The process of affixing a liner to the inside of a hollow circular collapsible tube cap, which comprises applying an adhesive to one face of a sheet of liner material, allowing the adhesive to dry, positioning the cap mouth upward, introducing a volatile solvent for the adhesive free from adhesive into the cap recess, bringing the sheet with the adhesive face downward above the cap in a position in line therewith, cutting out a liner disc from the sheet, carrying the disc into the cap where the adhesive is softened by the solvent and sealing the disc at the bottom of the cap recess.

5. The process of affixing a liner to the inside of a hollow circular collapsible tube cap, which comprises applying an adhesive to one face of a sheet of liner material, allowing the adhesive to dry, positioning the cap mouth upward, introducing a volatile solvent for the adhesive free from adhesive into the cap recess, bringing the sheet with its adhesive face downward into a position immediately above the cap mouth, and punching out and inserting a liner into the cap recess in contact with the solvent, in the same step pressing the liner against the back of the cap recess and thereby displacing any excess solvent.

6. The process of affixing a liner to the inside of a hollow circular collapsible tube cap, which comprises applying an adhesive to one face of the liner, allowing the adhesive to dry, introducing into the cap a volatile solvent free from adhesive, introducing the liner into the cap with the adhesive face toward the cap and thereby treating the adhesive with the solvent and rendering the adhesive pressure sensitive, allowing the solvent to evaporate and subsequently improving the adhesion between the liner and the cap by screwing the cap on a collapsible tube and thereby applying pressure to the liner against the cap.

JOHN L. LAY.

REFERENCES CITED

The following references are of record in the file of this patent:

UNITED STATES PATENTS

| Number | Name | Date |
|---|---|---|
| 1,227,160 | La Porte | May 22, 1917 |
| 2,080,256 | Eisen | May 11, 1937 |
| 2,129,349 | Eisen | Sept. 6, 1938 |
| 2,150,212 | Eisen | Mar. 14, 1939 |
| 2,322,885 | Rogers | June 29, 1943 |
| 2,367,250 | Warth et al. | Jan. 16, 1945 |